US007440466B2

(12) United States Patent
Lord et al.

(10) Patent No.: US 7,440,466 B2
(45) Date of Patent: Oct. 21, 2008

(54) METHOD, APPARATUS AND SYSTEM FOR ACCESSING MULTIPLE NODES ON A PRIVATE NETWORK

(75) Inventors: Christopher J. Lord, Portland, OR (US); Ajay Garg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 10/635,699

(22) Filed: Aug. 5, 2003

(65) Prior Publication Data

US 2005/0030956 A1 Feb. 10, 2005

(51) Int. Cl.
*H04L 12/28* (2006.01)
*H04J 3/16* (2006.01)

(52) U.S. Cl. ....................... 370/401; 370/466
(58) Field of Classification Search ........... None
See application file for complete search history.

(56) References Cited

U.S. PATENT DOCUMENTS

| | | | | |
|---|---|---|---|---|
| 7,275,262 | B1 * | 9/2007 | Habert | 726/26 |
| 2002/0083342 | A1 * | 6/2002 | Webb et al. | 713/201 |
| 2002/0120382 | A1 * | 8/2002 | Hatanaka et al. | 701/70 |
| 2003/0135548 | A1 * | 7/2003 | Bushkin | 709/203 |
| 2004/0076180 | A1 * | 4/2004 | Satapati et al. | 370/467 |
| 2004/0093434 | A1 * | 5/2004 | Hovell et al. | 709/249 |
| 2004/0107287 | A1 * | 6/2004 | Ananda et al. | 709/230 |
| 2004/0240468 | A1 * | 12/2004 | Chin et al. | 370/466 |

OTHER PUBLICATIONS

Information Science Institute University of Southern California "Internet Protocol Darpa Internet Program Protocol Specification" Sep. 1981, Defense Advanced Research Projects Agency Information Processing Techniques Office (pp. 1-55).
S. Deering/R. Hinden "Internet Protocol, Version 6 (IPv6) Specification" Dec. 1998, Network Working Group (pp. 1-42).

* cited by examiner

*Primary Examiner*—Andrew C. Lee
(74) *Attorney, Agent, or Firm*—Sharmini N. Green

(57) ABSTRACT

Nodes on a wide area network ("WAN") such as the Internet may communicate with multiple Internet Protocol Version 6 ("IPv6") nodes on a private network despite the lack of domain name service ("DNS") server support. The nodes on the private network may obtain router advertisements and utilize this information to generate IPv6 addresses (6-to-4 addresses). A detection process may detect these IPv6 addresses and create web pages including these addresses. When the nodes on the WAN attempt to reach the private nodes using an address of the gateway separating the WAN from the private network, the nodes may instead reach the web pages created by the detection process. These web pages may redirect the nodes to communicate with each of the private nodes using their respective IPv6 addresses.

18 Claims, 3 Drawing Sheets

METHOD, APPARATUS AND SYSTEM FOR ACCESSING MULTIPLE NODES ON A PRIVATE NETWORK

FIELD

The present invention relates to the field of computing, and, more particularly to a method, apparatus and system for enabling access to multiple servers on a private network without domain name services ("DNS") support.

BACKGROUND

Various communications protocols have been promulgated by the Internet Engineering Task Force ("IETF") to standardize communications on the Internet. Internet Protocol Version 6 (IETF RFC 2460, December 1998, hereafter "IPv6") refers to the most recent protocol, which addresses some of the shortcomings in older versions (e.g., Internet Protocol Version 4, IETF RFC 791, September 1981, hereafter "IPv4"), such as the limited availability of Internet addresses. Due to this limitation on addresses, IPv4-compliant networks have resorted to utilizing devices such as gateways to minimize the number of addresses necessary. Gateways are typically devices that provide high-speed Internet access to private networks, routing incoming data to and from nodes (e.g., personal computers and/or other networked devices such as networked media adapters for televisions and stereos, etc.) within private networks (e.g., home networks, small office home office ("SOHO") networks, etc.) to external networks (e.g., a wide area network ("WAN") such as the Internet). Gateways may be assigned a public address, and if configured to use a Network Address Translator ("NAT"), this single unique public Internet address may represent multiple nodes on the private network. Public addresses are typically automatically registered with one or more Domain Name Service ("DNS") servers. DNS servers enable nodes to register their Internet addresses along with a hostname. Thereafter, other nodes may reach the registered node via its address and/or its hostname.

IPv6-compliant networks, however, utilize 128-bit addresses (instead of 32-bit addresses used in IPv4-compliant networks), resulting in virtually an unlimited number of addresses. As such, every node on both public and private networks may be assigned a globally routable Internet address. IPv6 addresses are significantly more difficult to remember and/or use than IPv4 addresses due to the length and complexity of the addresses. The use of hostnames is therefore especially critical in IPv6 networks. Currently, however, there is no automatic registration mechanism by which IPv6 addresses on a private network may be registered with DNS servers on external networks. As such, IPv6 nodes within private networks may not be easily reached via hostnames from nodes on the external networks.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for accessing multiple nodes within a private network without DNS support. More specifically, according to embodiments of the invention, external nodes may access one or more IPv6 nodes on the private network, despite the lack of DNS support. Reference in the specification to "one embodiment" or "an embodiment" of the present invention means that a particular feature, structure or characteristic described in connection with the embodiment is included in at least one embodiment of the present invention. Thus, the phrases "in one embodiment", "according to one embodiment" or the like appearing in various places throughout the specification are not necessarily all referring to the same embodiment.

Figure 1:
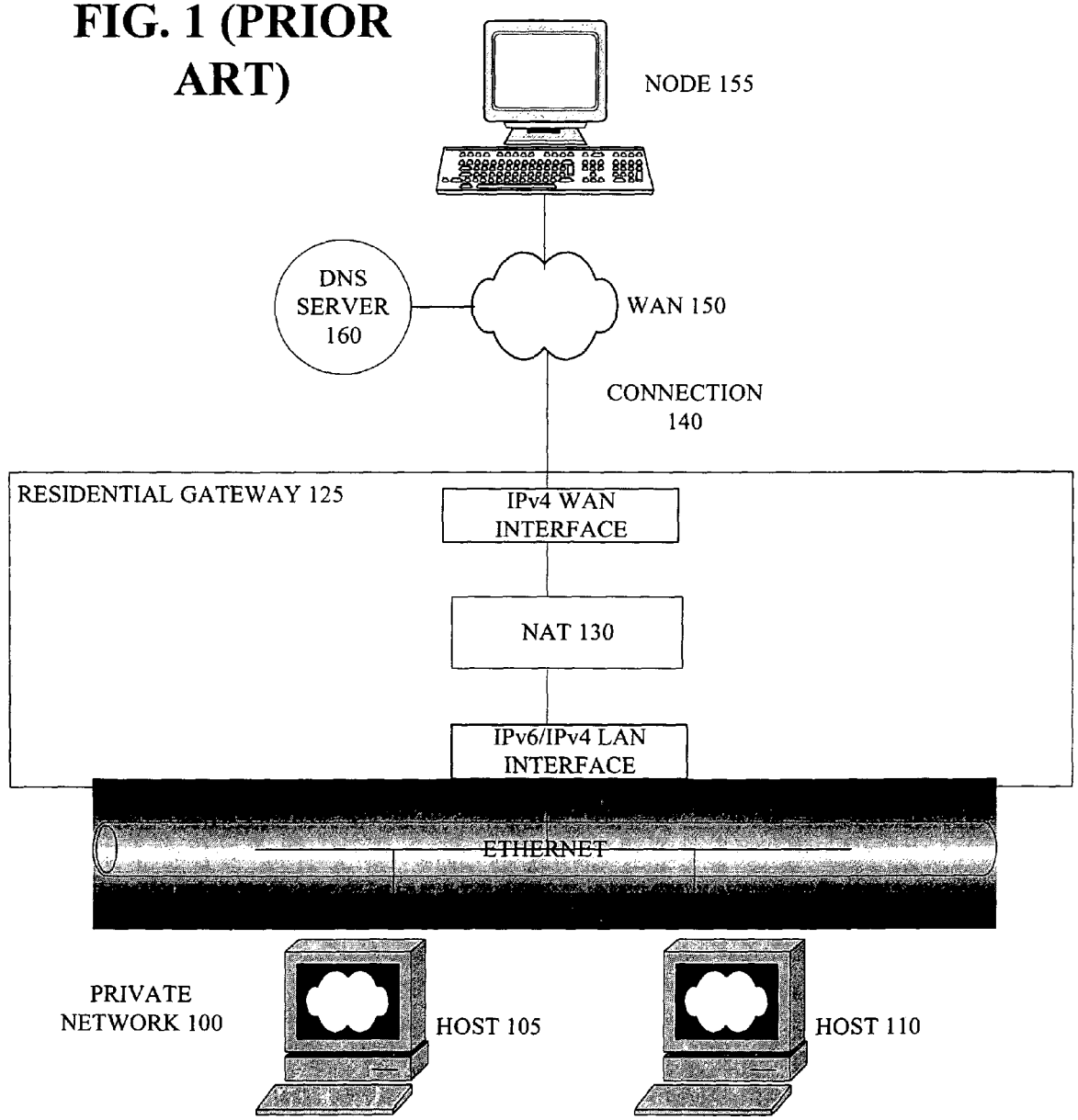
FIG. 1 illustrates a typical network configuration that includes a private network.

FIG. 1 illustrates a typical network configuration that includes a private network ("Private Network 100"). As illustrated, Private Network 100 may be coupled to Wide Area Network ("WAN") 150 (e.g., the Internet) via Connection 140 (e.g., a Digital Subscriber Loop ("DSL") connection, a Ti line and/or via a telephone line). Private Network 100 may include one or more servers (e.g., Host 105 and Host 110), and various other nodes (not illustrated). The system may also include a gateway ("Residential Gateway 125") separating WAN 150 from Private Network 100. For simplicity, the following description assumes the use of a Residential Gateway, but embodiments of the present invention are not so limited. Instead, the term Residential Gateway for the purposes of this specification shall include a variety of gateways (e.g., gateways for SOHOs).

If Private Network 100 is an IPv4-compliant network, Residential Gateway 125 may be assigned a public address that is registered with DNS Server 160. NAT 130 may properly route all communications from the internal nodes on Private Network 100 to external nodes on WAN 150. All communications from the external nodes on WAN 150 (e.g., Node 155) directed to internal nodes (e.g., hosts) on Private Network 100 may also be routed through Residential Gateway 125. In IPv4 networks that include NATs, however, in order for incoming communications to be routed, a connection must already exist between the internal nodes and the external nodes. To address this limitation, NAT 130 may be configured to allow connections from external nodes on WAN 150 to a given Transport Control Protocol/User Datagram Protocol ("TCP/UDP") port on Residential Gateway 125 to a single internal node address. As a result, communications from external nodes to internal nodes are limited to only one internal node because there is a one to one mapping between the external TCP/UDP port number and an internal IP address to forward as the destination. In other words, incoming communications may be routed to only one node on Private Network 100.

In order to enable communications with more than one node on Private Network 100, the owner of Private Network 100 must either incur the cost of obtaining an additional IP address from its network service provider, or configure Residential Gateway 125 in such a way as to force incoming messages to be routed to an alternative port number (i.e., a second node associated with an alternative port number). In the latter situation, the external node must know and specify the port number of the node it is trying to communicate with on the private network in order for the communication to be properly routed. Without the port number, the communication will automatically be routed to the default port number, i.e., to the first node.

IPv6-compliant networks, on the other hand, have an abundance of IP addresses available, and are not constrained by a limited number of IP addresses, as are IPv4-compliant networks. As a result, IPv6 networks typically do not support the use of NATs and instead assign public addresses to each IPv6 node (internal and external nodes). Thus, each node on an IPv6-compliant network may be accessed directly, which seemingly alleviates the problem described above for IPv4 network. IPv6 networks, however, currently include other limitations. Most significantly for the purposes of this specification, IPv6 networks do not utilize Dynamic Host Control Protocol ("DHCP"), which is typically used to register hostnames with DNS servers. As a result, there is currently no standard mechanism by which an IPv6-compliant node on Private Network 100 may register its hostname on a DNS server on WAN 150. Accordingly, any external node (e.g., Node 155) on WAN 150 attempting to communicate with an internal node (e.g., Host 105 and/or Host 110) on Private Network 100 has no simple mechanism to determine the node's hostname.

In the example illustrated in FIG. 1, if Host 105 and Host 110 are IPv6-compliant nodes, each may be assigned a public address, but the nodes have no mechanism by which to register their public addresses and hostnames on DNS Server 160. Similarly, an external node (e.g., Node 155) that desires to access Host 105 and/or Host 110 does not have any standard mechanism by which to identify and access the private nodes by hostname. Thus, although Host 105 and/Host 110 are both accessible on an IPv6 network directly (i.e., without Residential Gateway 125 and/or NAT 130), the external node desiring to communicate with either node on the private network cannot use the node's hostname and instead must know its IPv6 address. Given the complexity of the 128-bit IPv6 addresses, this does not present users with a viable long-term solution.

Figure 2:
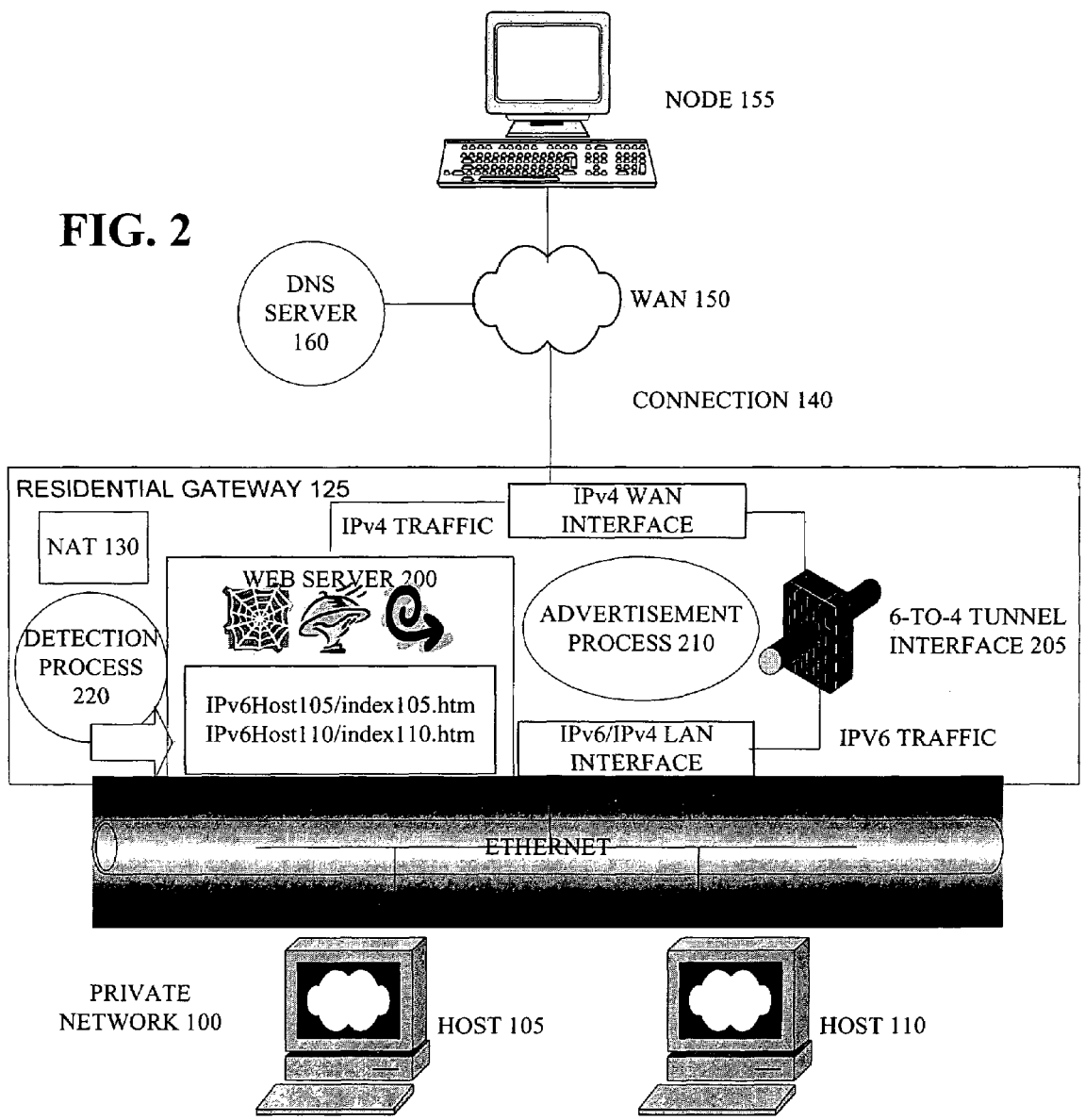
FIG. 2 illustrates an example network according to an embodiment of the present invention.

Embodiments of the present invention enable external nodes to access multiple IPv6 hosts on a private network despite the lack of DNS support. FIG. 2 illustrates an embodiment of the present invention. For the purposes of illustration, WAN 150 is assumed to be an IPv4-compliant network while Host 105 and Host 110 are IPv4/IPv6 nodes. Node 155 includes both IPv4 and IPv6 stacks, i.e., it may communicate with nodes on both IPv4 and/or IPv6-compliant networks. As in FIG. 1, Private Network 100 may include Residential Gateway 125 configured with a public address and running NAT 130 to translate IPv4 packets. Residential Gateway 125 may include a WAN interface coupling Private Network 100 to WAN 150, and a LAN interface coupling Residential Gateway 125 to Private Network 100. The WAN interface may be addressable by a hostname because the public address for Residential Gateway 125 may be registered with an Internet service provider on WAN 150 and made available via the DNS Server 160.

Residential Gateway 125 may include Web Server 200 and a "6-to-4 tunnel interface" ("6-to-4 Tunnel Interface 205"). 6-to-4 tunnels are well known to those of ordinary skill in the art and further description thereof is omitted herein in order not to unnecessarily obscure the present invention. Residential Gateway 125 may also include an IPv6 router advertisement process ("Advertisement Process 210"). Advertisement Process 210 may comprise a daemon, a system agent or other such process that executes in the background and performs specified operations at predefined times or in response to specific events. In embodiments of the present invention, Advertisement Process 210 includes a process that advertises the prefix for 6-to-4 Tunnel Interface 205 to IPv6 nodes on Private Network 100. In other words, Advertisement Process 210 provides internal nodes with information on how to generate IPv6 addresses for Host 105 and Host 110. Specifically, Host 105 and 110 may utilize the 6-to-4 prefix together with their unique Network Interface Card ("NIC") Media Access Control ("MAC") address to generate globally routable 6-to-4 addresses, typically known as a "2002::" addresses. By using the prefix to generate IPv6 routable addresses for Host 105 and Host 110, these IPv6 addresses may be carried and/or transported on any IPv4 network infrastructure via the 6-to-4 Tunnel Interface 205. The technique for generating these globally routable 6-to-4 addresses is well known in the art and further description thereof is omitted herein in order not to unnecessarily obscure embodiments of the present invention.

Residential Gateway 125 may additionally include a process that detects IPv6 nodes running within the private network (hereafter the process is referred to as "Detection Process 215"). Detection Process 215 may, for example, detect Host 105 and Host 110 as IPv6 nodes and collect a variety of information about the nodes. Various techniques for collecting this information may be used without departing from the spirit of embodiments of the present invention. For example, in one embodiment, the nodes may be Universal Plug And Play ("UPnP™") compliant and Detection Process 215 may be UPnP-aware. Detection Process 215 may therefore recognize broadcasts/multicasts from the UPnP-compliant nodes. The details of UPnP™ are well known to those of ordinary skill in the art and as such, further description of such is omitted herein. In an alternate embodiment, Detection Process 215 may detect the node addresses by monitoring neighbor discovery requests from IPv6 nodes when the nodes create their 6-to-4 addresses. Regardless of how the address information is gathered, in an embodiment, Detection Process 215 may use the information to generate a set of directories and web pages on Web Server 200. For example, as illustrated in FIG. 2, Detection Process 215 may generate a Host 105 directory, containing a web page (index105.htm) and a Host 110 directory containing another web page (index10.htm). These web pages may contain simple Hypertext Markup Language ("HTML") with Hypertext Transport Protocol ("HTTP") directives that redirect external nodes to Host 105 and/or Host 110. In other words, these web pages may include Host 105 and/or Host 110's IPv6 addresses and redirect external nodes to communicate directly with Host 105 and/or Host 110 using their IPv6 addresses. Although Web Server 200, Advertisement Process 210 and Detection Process 215 are illustrated as running on/within Residential Gateway 125, the server and processes may reside on separate devices coupled to Residential Gateway 125. Additionally, Advertisement Process 210 and/or Detection Process 215 may reside on or separate from Web Server 200. It will be readily apparent to those of ordinary skill in the art that these components may be configured in various ways without departing from the spirit of embodiments of the present invention.

The following describes an example of how an embodiment of the present invention may be implemented. In this example, Node 155 (an IPv4-IPv6 compatible node) desires to communicate with Host 105 and/or Host 110 (IPv6 nodes). Typically, when Residential Gateway 125 is initialized, it generates a DHCP request for an IPv4 address, and this address is registered by DNS Server 160 with Residential Gateway 125's hostname. Advertisement Process 210 may use the assigned IPv4 address to generate a 6-to-4 prefix and advertised this prefix on Private Network 100. Host 105 and/or Host 110 may utilize the prefix to generate 6-to-4 addresses (IPv6 routable addresses). Thereafter, when Node 155 initiates a DNS request to WAN 150 using Residential Gateway 125's hostname (since this is the only public address that Node 155 knows for Host 105 and/or Host 110), this request may be resolved by DNS Server 160 to the IPv4 address assigned to Residential Gateway 125. In one embodiment, Node 155 may be presented with a web page that includes index105.htm and/or index110.htm. These index files include directives for Node 155 to contact Host 105 and/or Host 110 directly at their IPv6 addresses. Node 155 may then use the IPv6 addresses to communicate directly with Host 105 and Host 110.

Figure 3:
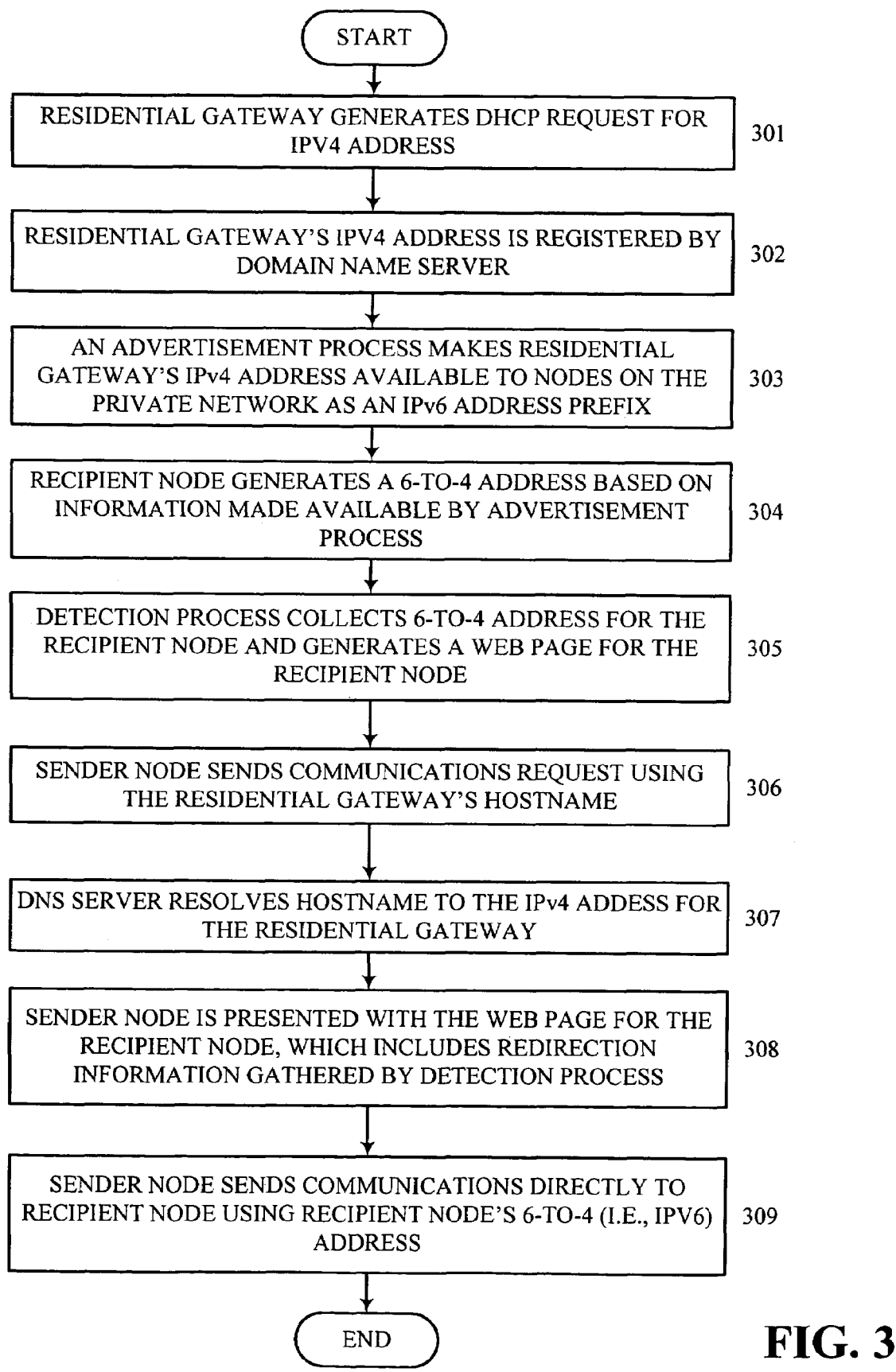
FIG. 3 is a flow chart illustrating an embodiment of the present invention.

FIG. 3 is a flow chart illustrating an embodiment of the present invention. Although the following operations may be described as a sequential process, many of the operations may in fact be performed in parallel or concurrently. In addition, the order of the operations may be re-arranged without departing from the spirit of embodiments of the invention. The flow chart illustrates how an IPv4-IPv6 compatible external node on a WAN (hereafter "sender node") may communicate with an IPv6 node on a private network ("recipient node"). In 301, the residential gateway may generate a DHCP request for an IPv4 address, and in 302, this address may be registered by DNS Server 160 with Residential Gateway 125's hostname. In 303, an advertisement process collects and makes available the information necessary for the recipient nodes on the private network to generate IPv6 routable addresses (6-to-4 addresses). In 304, the recipient nodes on the private network may generate IPv6 addresses from this IPv4 address (i.e., generate a 6-to-4 address) based on information made available by an advertisement process. A detection process may collect the IPv6 addresses for the private nodes in 305 and generate web pages for each recipient node. When the sender node initiates a communications request with the recipient node using the gateway's hostname in 306, a DNS server may resolve this hostname in 307 to an IPv4 address corresponding to the gateway. In 308, the sender node is presented with the web page for one or more recipient nodes (e.g., an index file for the recipient node(s)). These web pages may include redirection information for the recipient nodes, based on the information collected by the detection process in 305 (e.g., the recipient node's IPv6 address). In 309, the sender node may then send communications directly to the recipient node using the recipient node's IPv6 address.

It will be readily apparent to those of ordinary skill in the art that certain operations described above may not necessarily be performed every time a sender node desires to communicate with a recipient node. For example, once the recipient nodes on the private network obtain the appropriate information to generate IPv6 routable addresses, the detection process may collect these addresses and generate the web pages for each of the nodes. These operations may not necessarily be repeated every time a sender node attempts to communicate with a recipient node. Instead, in one embodiment, these operations may be performed only once, when a sender node first attempts to contact a recipient node. Alternatively, these operations may be performed each time a node is added to the private network and/or each time the address of the gateway is changed. Other configurations may also be practiced without departing from the spirit of embodiments of the present invention.

Embodiments of the present invention may be implemented on a variety of data processing devices. It will be readily apparent to those of ordinary skill in the art that these data processing devices may include various software, and may comprise any devices capable of supporting the IP protocol, including but not limited to mainframes, workstations, personal computers, laptops, portable handheld computers, PDAs and/or cellular telephones.

According to embodiment of the present invention, data processing devices may include various components capable of executing instructions to accomplish an embodiment of the present invention. For example, the data processing devices may include and/or be coupled to at least one machine-accessible medium. As used in this specification, a "machine" includes, but is not limited to, any data processing device with one or more processors. As used in this specification, a machine-accessible medium includes any mechanism that stores and/or transmits information in any form accessible by a data processing device, the machine-accessible medium including but not limited to, recordable/non-recordable media (such as read only memory (ROM), random access memory (RAM), magnetic disk storage media, optical storage media and flash memory devices), as well as electrical, optical, acoustical or other form of propagated signals (such as carrier waves, infrared signals and digital signals).

According to an embodiment, a data processing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. A host bus host controller such as a Universal Serial Bus ("USB") host controller may be coupled to the bus(es) and a plurality of devices may be coupled to the USB. For example, user input devices such as a keyboard and mouse may be included in the data processing device for providing input data.

In the foregoing specification, the invention has been described with reference to specific exemplary embodiments thereof. It will, however, be appreciated that various modifications and changes may be made thereto without departing from the broader spirit and scope of embodiments of the invention, as set forth in the appended claims. The specification and drawings are, accordingly, to be regarded in an illustrative rather than a restrictive sense.

What is claimed is:

1. A system for accessing multiple Internet Protocol Version 6 ("IPv6") nodes on a private network, comprising:
   a gateway separating the private network from a public network;
   a detection module coupled to the gateway, the detection module for identifying the multiple IPv6 nodes on the private network, the detection module further for redirecting communications requests to each of the multiple IPv6 nodes on the private network; and
   an advertising module for generating a 6-to-4 prefix from an address of the gateway and providing the 6-to-4 prefix to each of the multiple IPV6 nodes on the private network.

2. The system according to claim 1 wherein the detection module is further for generating a web page for each of the multiple IPv6 nodes on the private network.

3. The system according to claim 2 wherein the web page for each of the multiple nodes on the private network includes at least one redirect command to each of the multiple IPv6 nodes.

4. The system according to claim 3 wherein each of the at least one redirect command includes an IPv6 address for each of the multiple IPv6 nodes on the private network.

5. The system according to claim 1 further comprising a web server capable of executing the detection process.

6. The system according to claim 5 wherein the web server resides on the gateway.

7. The system according to claim 1 wherein the gateway is for receiving a communication request from a node on the public network.

8. The system according to claim 7 wherein the communication request from the node on the public network results in a redirect error returned to the node on the public network.

9. The system according to claim 8 wherein the redirect error includes information pertaining to a publicly accessible address for the at least one of the multiple IPv6 nodes on the private network.

10. The system according to claim 1 wherein the gateway includes the detection module.

11. A method for accessing multiple IPV6 nodes on a private network, comprising:
    collecting IPv6 addresses of each of the multiple nodes on the private network;
    generating an index file for each of the multiple nodes on the private network and redirecting communications requests from an external node to each of the multiple IPv6 nodes by providing the external node with the IPv6 addresses for at least one of the multiple IPv6 nodes on the private network.

12. The method according to claim 11 wherein collecting the IPv6 addresses of each of the multiple IPV6 nodes further comprises monitoring neighbor discovery requests to identify the IPv6 addresses of each of the multiple IPV6 nodes.

13. The method according to claim 11 wherein collecting the IPv6 addresses of each of the multiple IPV6 nodes further comprises collecting the IPv6 addresses of each of the multiple IPV6 nodes from Universal Plug and Play (UPnP) broadcasts from each of the multiple IPV6 nodes.

14. The method according to claim 11 wherein redirecting the communications requests further comprises:
    responding to the communications request by opening a web page corresponding to at least one of the multiple IPV6 nodes; and
    redirecting the external node to at least one of the IPv6 addresses contained within the web page.

15. An article comprising a machine-accessible medium having stored thereon instructions that, when executed by a machine, cause the machine to:
    collect IPv6 addresses of each of the multiple IPV6 nodes on a private network;
    generate an index file for each of the multiple IPV6 nodes on the private network redirect communications requests from an external node to each of the multiple IPV6 nodes by providing the external node with the IPv6 addresses for at least one of the multiple IPV6 nodes on the private network.

16. The article according to claim 15 wherein the instructions further cause the machine to monitor neighbor discovery requests to identify the IPv6 addresses of each of the multiple IPV6 nodes.

17. The article according to claim 15 wherein the instructions further cause the machine to collect the IPv6 addresses of each of the multiple IPV6 nodes from Universal Plug and Play (UPnP) broadcasts from each of the multiple IPV6 nodes.

18. The article according to claim 15 wherein the instructions further cause the machine to:
    respond to the communications request by opening a web page corresponding to at least one of the multiple IPV6 nodes; and
    redirect the external node to at least one of the IPv6 addresses contained within the web page.

* * * * *